United States Patent
Sudou

(10) Patent No.: US 9,689,358 B2
(45) Date of Patent: Jun. 27, 2017

(54) AIR FLOW MEASURING DEVICE

(71) Applicant: DENSO CORPORATION, Kariya, Aichi-pref. (JP)

(72) Inventor: Akiyuki Sudou, Takahama (JP)

(73) Assignee: DENSO CORPORATION, Kariya (JP)

( * ) Notice: Subject to any disclaimer, the term of this patent is extended or adjusted under 35 U.S.C. 154(b) by 243 days.

(21) Appl. No.: 14/696,699

(22) Filed: Apr. 27, 2015

(65) Prior Publication Data

US 2015/0308392 A1    Oct. 29, 2015

(30) Foreign Application Priority Data

Apr. 28, 2014    (JP) .................................. 2014-92205

(51) Int. Cl.
| | | |
|---|---|---|
| *G01F 1/684* | (2006.01) | |
| *F02M 35/10* | (2006.01) | |
| *G01F 1/69* | (2006.01) | |
| *G01F 5/00* | (2006.01) | |
| *F02D 41/18* | (2006.01) | |

(52) U.S. Cl.
CPC ..... *F02M 35/10386* (2013.01); *F02D 41/187* (2013.01); *G01F 1/6842* (2013.01); *G01F 1/69* (2013.01); *G01F 5/00* (2013.01)

(58) Field of Classification Search
CPC .......... G01F 1/684; G01F 1/6842; G01F 1/69; G01F 5/00; G01F 15/006; G01F 15/14; F02D 41/187; F02M 35/10386
See application file for complete search history.

(56) References Cited

U.S. PATENT DOCUMENTS

| | | | | |
|---|---|---|---|---|
| 5,325,712 A | * | 7/1994 | Tsutsui .................... | G01F 1/684 73/114.34 |
| 8,916,074 B2 | * | 12/2014 | Takiguchi ............. | G01F 1/6842 264/251 |
| 2002/0023486 A1 | * | 2/2002 | Watanabe ............... | G01F 1/684 73/202.5 |
| 2003/0087448 A1 | * | 5/2003 | Abe ........................ | G01F 1/684 436/73 |
| 2005/0241386 A1 | * | 11/2005 | Goka ........................ | G01F 5/00 73/202.5 |
| 2005/0241389 A1 | * | 11/2005 | Kitahara ................... | G01F 5/00 73/204.23 |
| 2005/0252289 A1 | * | 11/2005 | Kitahara ................... | G01F 5/00 73/204.22 |

(Continued)

*Primary Examiner* — Natalie Huls
(74) *Attorney, Agent, or Firm* — Nixon & Vanderhye P.C.

(57) ABSTRACT

A second sensor includes a lead wire and is exposed to intake air flowing through a passage outside a housing. A conduction body is conductively-joined to the wire. A lead hole opens on an exposed surface, and the wire or the conduction body is pulled out of the passage through the hole. A predetermined terminal is conductively-joined to the wire or the conduction body which is pulled out through the hole. A mold part is provided by injection-molding from resin fluid to seal a conductively-joined part between the wire or the conduction body and the predetermined terminal. The hole is filled up with a filler material to limit leakage of intake air from the passage. A high resilient part has higher resilience than the filler material and is located between the filler material and the mold part to receive injection pressure at time of the injection-molding of the mold part.

2 Claims, 6 Drawing Sheets

(56) References Cited

U.S. PATENT DOCUMENTS

| | | | |
|---|---|---|---|
| 2006/0112763 A1* | 6/2006 | Uramachi | G01F 1/6842 73/204.22 |
| 2009/0000366 A1* | 1/2009 | Uramachi | G01F 15/185 73/114.32 |
| 2009/0151451 A1* | 6/2009 | Ratzel | B81B 3/0078 73/488 |
| 2012/0160024 A1* | 6/2012 | Matsumoto | G01F 1/6842 73/204.11 |
| 2012/0198925 A1* | 8/2012 | Saito | F02D 41/187 73/114.33 |
| 2012/0325011 A1* | 12/2012 | Takiguchi | G01F 1/6842 73/861 |
| 2013/0118242 A1 | 5/2013 | Sudou | |
| 2013/0152699 A1* | 6/2013 | Suzuki | G01F 1/684 73/861.02 |
| 2014/0190270 A1* | 7/2014 | Suzuki | G01F 1/696 73/861.03 |
| 2014/0331761 A1* | 11/2014 | Kaifu | F02M 35/10386 73/204.25 |
| 2014/0360262 A1* | 12/2014 | Asano | G01F 1/684 73/204.19 |
| 2015/0308871 A1* | 10/2015 | Sudou | G01F 1/684 73/204.11 |
| 2015/0308872 A1* | 10/2015 | Sudou | G01F 1/6842 73/202.5 |
| 2015/0355005 A1* | 12/2015 | Kohno | F02D 41/18 73/114.34 |
| 2015/0355009 A1* | 12/2015 | Goka | G01F 5/00 73/202 |
| 2015/0377671 A1* | 12/2015 | Ooga | G01F 1/6842 73/114.32 |
| 2015/0377676 A1* | 12/2015 | Asano | G01F 1/684 73/861 |
| 2016/0161313 A1* | 6/2016 | Yamaguchi | G01F 1/684 73/114.34 |

* cited by examiner

FLOW DIRECTION IN INTAKE PASSAGE

AIR FLOW MEASURING DEVICE

CROSS REFERENCE TO RELATED APPLICATION

This application is based on Japanese Patent Application No. 2014-92205 filed on Apr. 28, 2014, the disclosure of which is incorporated herein by reference.

TECHNICAL FIELD

The present disclosure relates to an air flow measuring device that measures a flow rate of air.

BACKGROUND

Conventionally, for an air flow measuring device that measures a flow rate of intake air drawn into an internal combustion engine (may hereinafter be referred to as an intake air amount), for example, there is known a device that employs a thermal-type measuring method whereby a signal is produced in accordance with the flow rate by use of heat transfer between the device and the air. This air flow measuring device includes the following housings and sensor. The housing is disposed to project into an intake passage leading to the engine, and defines an internal passage which takes in a part of intake air flowing through the intake passage and through which the taken-in air passes. The sensor projects into the internal passage, and produces a signal according to the intake air amount by heat transfer between the sensor and the intake air passing through the internal passage.

There is a demand on the air flow measuring device for attachment of a sensor for detecting temperature, humidity and so forth of intake air separately from the sensor disposed in the internal passage (the sensor disposed in the internal passage to produce a signal according to the intake air amount is hereinafter referred to as a first sensor, and the sensor attached separately from the first sensor for detecting temperature, humidity and so forth of intake air is hereinafter referred to as a second sensor). Accordingly, there is proposed a structure that produces a signal by exposing a sensing part of the second sensor directly to the flow of intake air outside the housing.

Because of a cost advantage, employment of a component with a lead wire is considered for the second sensor. For this reason, there is studied a configuration whereby a hole communicating with the inside and outside of the intake passage is provided for the housing, and the lead wire is pulled out of the intake passage with the sensing part remaining disposed in the intake passage, or the lead wire and a rod-shaped conduction body are conductively joined together and the conduction body is pulled out of the intake passage with a conductively joining part between the lead wire and the conduction body, and the sensing part remaining disposed in the intake passage.

The lead wire or the conduction body pulled out of the hole, and a terminal are conductively joined together, and the hole is filled up with a material having a low modulus of elasticity such as silicon to prevent the intake air from leaking out (the hole for pulling the lead wire or the conduction body out of the intake passage is hereinafter referred to as a lead hole, and the material having a low modulus of elasticity with which the lead hole is filled up for the leak prevention of intake air is hereinafter referred to as a filler material. In addition, the lead wire and the conduction body may be collectively referred to as a lead wire or the like).

Moreover, in the air flow measuring device, the terminals are conductively joined together outside the housing to configure a circuit including various kinds of elements of the first sensor. Accordingly, there is known a technical idea of use of injection-molding which gives a cost advantage for providing a mold part for sealing a conductively joining part between the terminals (see, e.g., JP2013-104759A). In case of the attachment of the second sensor, use of injection-molding for sealing a conductively joining part between the lead wire or the like and the terminal may similarly have a cost advantage.

However, when the conductively joining part between the lead wire or the like and the terminal is sealed by injection-molding from resin fluid, high injection pressure is applied to the filler material, so that the filler material may not resist the injection pressure. Therefore, in sealing the conductively joining part between the lead wire or the like and the terminal, it is necessary to prevent or alleviate the application of the injection pressure to the filler material in order to employ injection-molding having a cost advantage.

SUMMARY

The present disclosure addresses at least one of the above issues. Thus, it is an objective of the present disclosure to employ injection-molding having a cost advantage in sealing a conductively joining part between a lead wire or the like and a terminal in an air flow measuring device including a second sensor with the lead wire outside a housing.

To achieve the objective of the present disclosure, there is provided an air flow measuring device adapted to project into a passage for intake air drawn into an internal combustion engine, for producing a signal in accordance with a flow rate of the intake air in the passage. The air flow measuring device includes a housing, a first sensor, a second sensor, a conduction body, a lead hole, a predetermined first terminal, a mold part, a filler material, and a high resilient part. The housing defines an internal passage which takes in a part of the intake air flowing through the passage and through which the taken-in intake air passes. The housing includes an exposed surface which is exposed to the intake air flowing through the passage. The first sensor projects into the internal passage to produce the signal in accordance with the flow rate of the intake air in the passage. The second sensor includes a lead wire and is exposed to the intake air flowing through the passage outside the housing. The second sensor produces a signal separately from the first sensor. The conduction body is conductively joined to the lead wire of the second sensor. The lead hole is a hole opening on the exposed surface, and the lead wire or the conduction body is pulled out of the passage through the lead hole. The predetermined first terminal is conductively joined to the lead wire or the conduction body which is pulled out through the lead hole. The mold part is provided by injection-molding from resin fluid to seal a conductively-joined part between the lead wire or the conduction body and the predetermined first terminal. The lead hole is filled up with the filler material to limit leakage of the intake air from the passage. The high resilient part is provided to have higher resilience than the filler material and is located between the filler material and the mold part to receive injection pressure at time of the injection-molding of the mold part.

Accordingly, application of the injection pressure to the filler material can be prevented or alleviated by the high resilient part. As a result, in the air flow measuring device including the second sensor with the lead wire outside the housing, the injection-molding having a cost advantage can be employed in sealing the conductively joining part between the lead wire or the like and the terminal.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
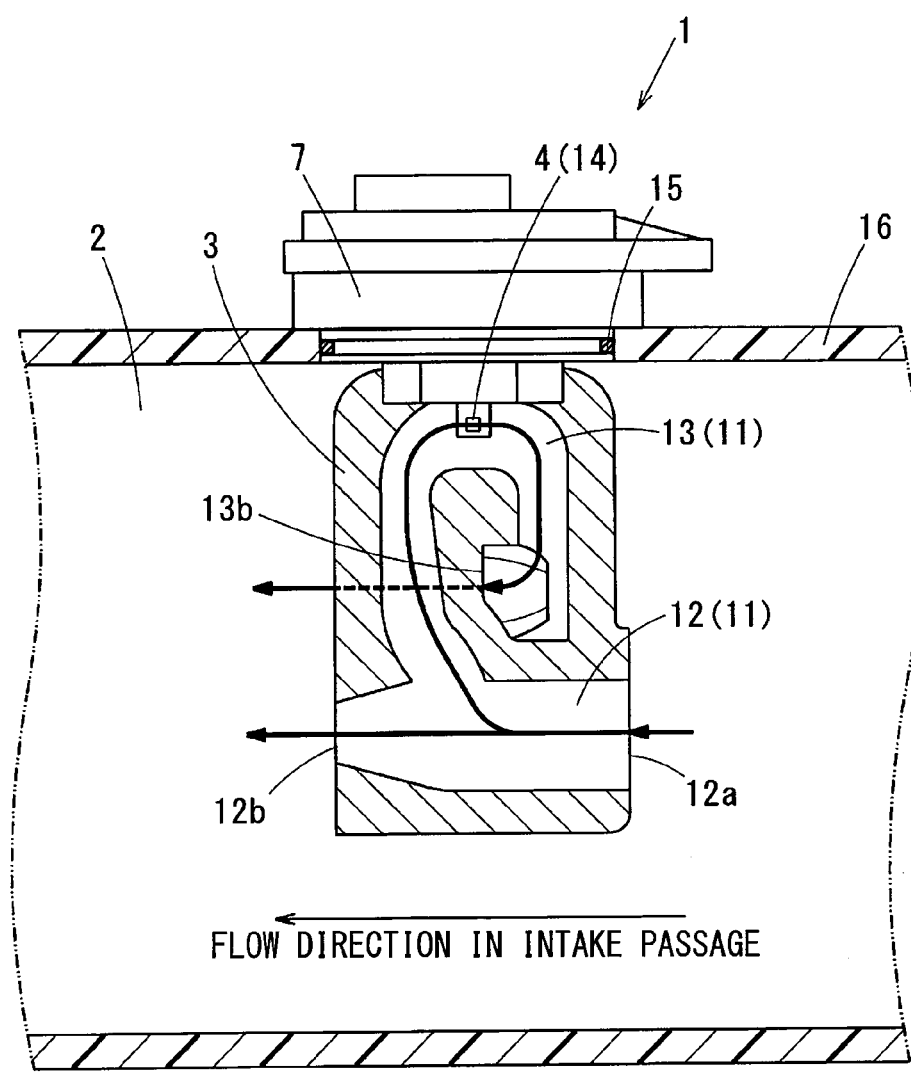
FIG. 1 is a sectional view illustrating inside of an air flow measuring device in accordance with an embodiment.
Figure 2:
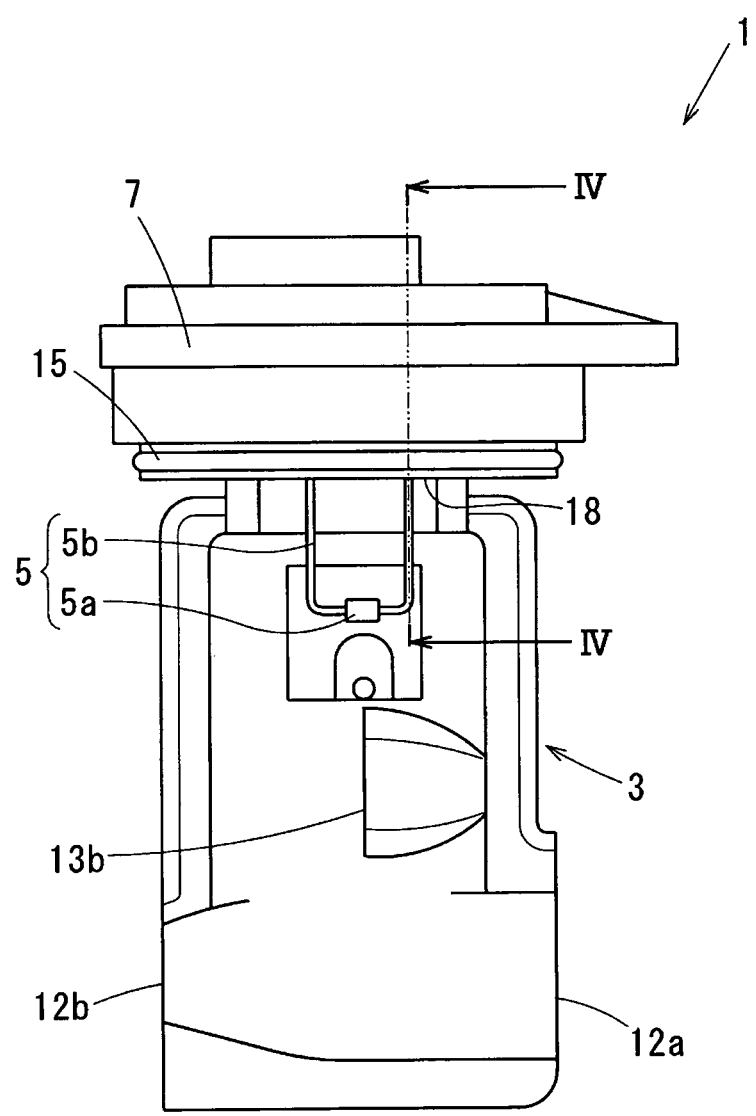
FIG. 2 is a side view illustrating the air flow measuring device of the embodiment.
Figure 3:
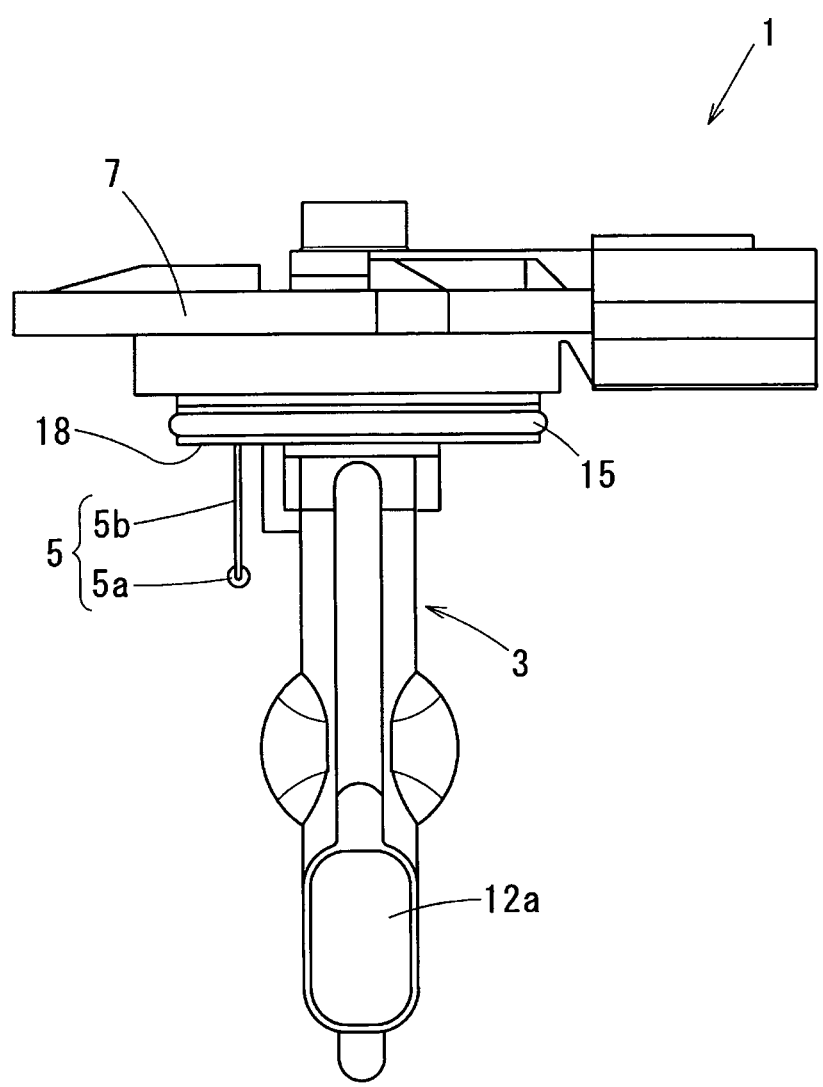
FIG. 3 is a rear view illustrating the air flow measuring device of the embodiment.

An embodiment will be described below. The embodiment illustrates a specific example, and it goes without saying that the present disclosure is not limited to the embodiment.

A configuration of an air flow measuring device 1 of the embodiment will be described with reference to FIGS. 1 to 4. The air flow measuring device 1 employs a thermal-type measuring method whereby to produce a signal in accordance with a flow rate of air by use of heat transfer between the device and the air. For example, the air flow measuring device 1 is disposed to project into an intake passage 2 (see FIG. 1) leading to an internal combustion engine (not shown) to measure a flow rate (intake air amount) of intake air drawn into the engine, and produces a signal in accordance with the intake air amount. The signal produced by the air flow measuring device 1 is outputted to an electronic control unit (ECU; not shown) provided separately from the air flow measuring device 1, and is used for controlling operation of the engine as a signal indicating the intake air amount.

The air flow measuring device 1 includes a housing 3, a first sensor 4, a second sensor 5, a lead hole 6, a mold part 7, a filler material 8, and a high resilient part 9, which will be described below. The housing 3 includes an internal passage 11 which takes in a part of intake air flowing through an intake passage 2 and through which this air passes, and is a resin molded component. The first sensor 4 is a thermal-type sensor that projects into the internal passage 11 and produces a signal in accordance with the intake air amount.

The internal passage 11 mainly includes a first flow passage 12 that makes the taken-in intake air flow straight in the approximately same direction as a flow through the intake passage 2 and discharges this intake air, and a second flow passage 13 that separates a part of the flow of intake air from the first flow passage 12 to flow around and to discharge this intake air. The first sensor 4 projects into the second flow passage 13 to produce a signal by heat transfer between the first sensor 4 and the intake air passing through the second flow passage 13. Dust or the like contained in the taken-in intake air does not flow into the second flow passage 13 and proceeds through the first flow passage 12 due to its own inertia. Accordingly, damage to the first sensor 4 from dust or the like is prevented.

An inlet port for intake air of the internal passage 11 (i.e., an inlet port 12a of the first flow passage 12) opens toward an upstream side in the intake passage 2 to take in a part of intake air flowing through the intake passage 2. A discharge port 12b of the first flow passage 12 opens toward a downstream side in the intake passage 2 to discharge the intake air together with the dust. Two divided discharge ports 13b of the second flow passage 13 are provided to position the discharge port 12b of the first flow passage 12 therebetween, and open toward a downstream side in the intake passage 2. Accordingly, the second flow passage 13 branches into two passages on a downstream side of the first sensor 4.

The first sensor 4 is integrated by resin with a processing circuit (not shown) that performs predetermined processing on the signal produced by the first sensor 4 and outputs the processed signal, and a predetermined terminal (not shown) to constitute one assembly 14. The assembly 14 is attached to the housing 3, so that the first sensor 4 is disposed to project into the internal passage 11. A conductively joining part between the terminal included in the assembly 14 and another terminal (not shown) is provided outside the intake passage 2, and is sealed by the mold part 7. The housing 3 is attached to a pipe 16 which defines the intake passage 2 with an O-ring 15 attached around the housing 3, and leakage of intake air is prevented by the O-ring 15.

The second sensor 5 is a component with a lead wire that produces a signal separately from the first sensor 4, and its sensing part 5a is exposed to the intake air flowing through the intake passage 2 outside the housing 3. The second sensor 5 is provided for producing a signal according to the physical quantities of intake air, such as temperature and humidity of intake air to measure these physical quantities.

The lead hole 6 is a through hole that opens on an intake-air exposed surface 18 of the surface of the housing 3 which is exposed to the intake air flowing through the intake passage 2 and on a molded surface 19 of the surface of the housing 3 which defines a surface boundary relative to the mold part 7. The lead hole 6 is provided for pulling a lead wire 5b of the second sensor 5 out of the intake passage 2 through the lead hole 6 (see FIG. 4). The mold part 7 is provided by injection-molding from resin fluid to seal a conductively joining part between the lead wire 5b pulled out from the lead hole 6 and a predetermined terminal 20 (see FIG. 4).

Figure 4:
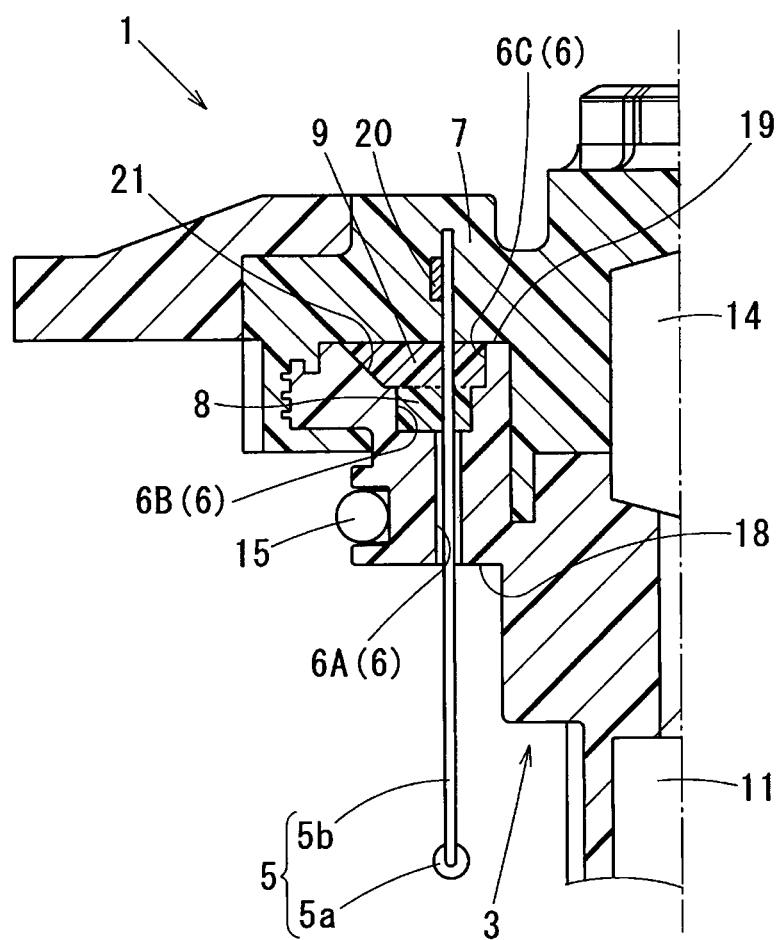
FIG. 4 is a sectional view taken along a line IV-IV in FIG. 2 according to the embodiment.

The lead hole 6 is filled up with the filler material 8 to prevent the leakage of intake air from the intake passage 2 (see FIG. 4). The high resilient part 9 is provided to have higher resilience than the filler material 8 and is located between the filler material 8 and the mold part 7 to receive the injection pressure of fluid resin at the time of injection-molding of the mold part 7 (see FIG. 4).

The lead hole 6 is divided into three regions 6A, 6B, 6C from the intake air exposed surface 18 to the molded surface 19, and the lead wire 5b passes linearly through the regions 6A, 6B, 6C without flection. Only the lead wire 5b passes through the cylindrical region 6A which opens on the intake air exposed surface 18, and the intake air flows into the region 6A from the intake passage 2. The region 6B provided continuously with the molded surface 19-side part of the region 6A is cylindrically formed with its cross section perpendicular to the lead wire 5b having a rectangular shape, and the region 6B is filled up with the filler material 8. The filler material 8 is a material having a low modulus of elasticity such as silicon, and the layer of the filler material 8 has high airtightness against the intake passage 2.

The region 6C provided continuously with the molded surface 19-side part of the region 6B opens on the molded surface 19. The region 6C is filled up with a material constituting the high resilient part 9 or this material is attached to the region 6C, for example. A wall surface defining the region 6C serves as a surface boundary relative to the high resilient part 9. A cross section of the region 6C perpendicular to the lead wire 5b has a rectangular shape, and a part of the wall surface defining the region 6C serves as a tapered part 21 whose cross section increases toward the molded surface 19.

The high resilient part 9 is pressed by the injection pressure received from the resin fluid at the time of injection-molding of the mold part 7 to apply pressing force to the housing 3 via the tapered part 21, and this pressing force is applied perpendicular to the tapered part 21. The high resilient part 9 is made from a resin material or a metallic material having a higher modulus of resiliency than the filler material 8. For example, epoxy resin may be used for the high resilient part 9 if a resin material is employed as a material for the high resilient part 9.

Effects of the embodiment will be described below. In the air flow measuring device 1 of the embodiment, the lead hole 6 is filled up with the filler material 8 to prevent the leakage of intake air from the intake passage 2, and the lead wire 5b pulled out from the lead hole 6 is conductively joined to the terminal 20 to be sealed with the mold part 7. The high resilient part 9 having higher resilience than the filler material 8 is located between the filler material 8 and the mold part 7, and receives the injection pressure at the time of injection-molding of the mold part 7. Accordingly, application of the injection pressure to the filler material 8 can be prevented or alleviated by the high resilient part 9. As a result, in the air flow measuring device 1, the injection-molding having a cost advantage can be employed in sealing the conductively joining part between the lead wire 5b of the second sensor 5 and the terminal 20.

The first sensor 4 is integrated by resin with the processing circuit and the predetermined terminal to constitute the one assembly 14. The conductively joining part between the terminal included in the assembly 14 and another terminal is sealed by the mold part 7. Accordingly, the conductively joining part between the terminal included in the assembly 14 and another terminal, and the conductively joining part between the lead wire 5b of the second sensor 5 and the terminal 20 can be sealed by the same injection-molding. As a result, the air flow measuring device 1 can be provided further at low cost.

In addition, the high resilient part 9 is pressed by the injection pressure received at the time of injection-molding of the mold part 7 to apply pressing force to the housing 3, and this pressing force is applied in a direction perpendicular to the tapered part 21. Accordingly, the high resilient part 9 is pressed strongly against the housing 3 by a wedge effect. As a result, the airtightness against the intake passage 2 can be further improved.

Modifications to the above-described embodiment will be explained below. In the air flow measuring device 1 of the embodiment, the lead wire 5b is pulled out of the intake passage 2 through the lead hole 6, and the conductively joining part between the lead wire 5b and the terminal 20 is sealed with the mold part 7. However, the conduction between the lead wire 5b and the terminal 20 is not limited to such an aspect.

Figure 5:
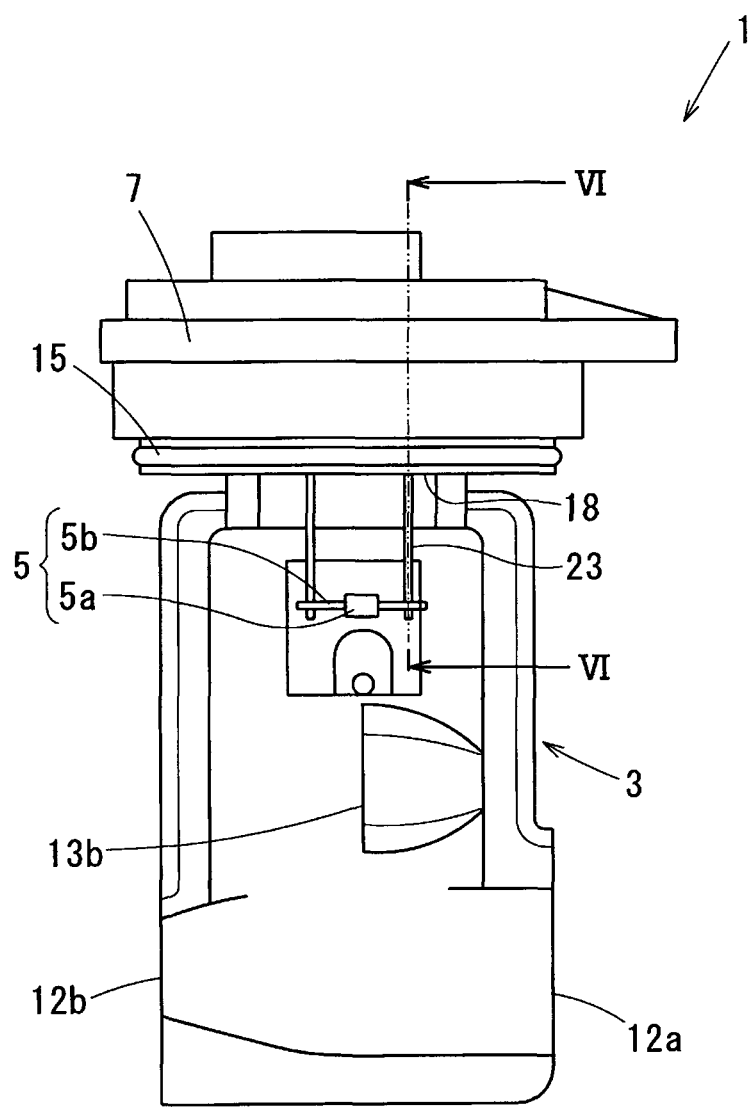
FIG. 5 is a side view illustrating an air flow measuring device in accordance with a modification.
Figure 6:
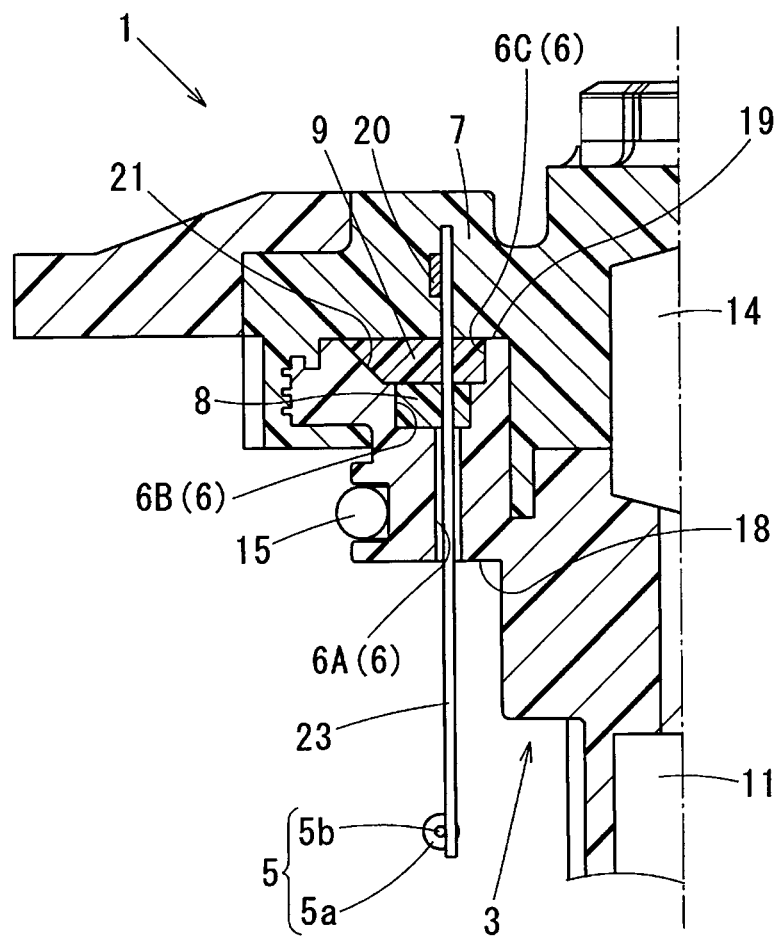
FIG. 6 is a sectional view taken along a line VI-VI in FIG. 5 according to the modification.

For example, as illustrated in FIGS. 5 and 6, a lead wire 5b and a rod-shaped conduction body 23 are conductively joined together, and a sensing part 5a and the lead wire 5b are both arranged inside an intake passage 2. Furthermore, a conductively joining part between the lead wire 5b and the conduction body 23 is disposed inside the intake passage 2. The conduction body 23 is pulled out of the intake passage 2 through a lead hole 6, and a terminal 20 and the conduction body 23 are conductively joined together. Additionally, a conductively joining part between the terminal 20 and the conduction body 23 may be sealed with a mold part 7.

In the air flow measuring device 1 of the embodiment, the high resilient part 9 is provided to be fitted in the lead hole 6. However, the high resilient part 9 may be provided at any position as long as the filler material 8 can be blocked by the high resilient part 9 relative to the mold part 7. For example, the high resilient part 9 may be provided outside the lead hole 6.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An air flow measuring device adapted to project into a passage for intake air drawn into an internal combustion engine, for producing a signal in accordance with a flow rate of the intake air in the passage, the air flow measuring device comprising:
   a housing that defines an internal passage which takes in a part of the intake air flowing through the passage and through which the taken-in intake air passes, wherein the housing includes an exposed surface which is exposed to the intake air flowing through the passage;
   a first sensor that projects into the internal passage to produce the signal in accordance with the flow rate of the intake air in the passage;
   a second sensor that includes a lead wire and is exposed to the intake air flowing through the passage outside the housing, wherein the second sensor produces a signal separately from the first sensor;
   a conduction body that is conductively joined to the lead wire of the second sensor;
   a lead hole which is a hole opening on the exposed surface and through which the lead wire or the conduction body is pulled out of the passage;
   a predetermined first terminal that is conductively joined to the lead wire or the conduction body which is pulled out through the lead hole;
   a mold part that is provided by injection-molding from resin fluid to seal a conductively-joined part between the lead wire or the conduction body and the predetermined first terminal;
   a filler material with which the lead hole is filled up to limit leakage of the intake air from the passage; and
   a high resilient part that is provided to have higher resilience than the filler material and is located between the filler material and the mold part to receive injection pressure at time of the injection-molding of the mold part.

2. The air flow measuring device according to claim 1, further comprising:

a processing circuit that performs predetermined processing on the signal produced by the first sensor and outputs the processed signal; and a predetermined second terminal, wherein:

the first sensor is integrated by resin together with the processing circuit and the predetermined second terminal to constitute one assembly; and a conductively-joined part between the predetermined second terminal included in the one assembly and another terminal is sealed by the mold part.

\* \* \* \* \*